(12) United States Patent
Watanabe et al.

(10) Patent No.: US 12,449,350 B2
(45) Date of Patent: Oct. 21, 2025

(54) DETERMINATION METHOD

(71) Applicant: SEIKO EPSON CORPORATION, Tokyo (JP)

(72) Inventors: Ryoki Watanabe, Matsumoto (JP); Hikaru Kurasawa, Shiojiri (JP); Yoshihiro Oshita, Shiojiri (JP); Masashi Kanai, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 1155 days.

(21) Appl. No.: 17/332,057

(22) Filed: May 27, 2021

(65) Prior Publication Data
US 2021/0381955 A1    Dec. 9, 2021

(30) Foreign Application Priority Data

Jun. 3, 2020  (JP) .................. 2020-096980

(51) Int. Cl.
| G06N 3/126 | (2023.01) |
| G01J 3/12 | (2006.01) |
| G01J 3/28 | (2006.01) |
| G01J 3/45 | (2006.01) |
| G01N 21/25 | (2006.01) |
| G06N 3/12 | (2023.01) |

(52) U.S. Cl.
CPC .............. *G01N 21/255* (2013.01); *G01J 3/12* (2013.01); *G01J 3/2823* (2013.01); *G01J 3/45* (2013.01); *G06N 3/12* (2013.01); *G01J 2003/1247* (2013.01)

(58) Field of Classification Search
CPC ... G06N 3/12; G06N 3/126; G01J 3/12; G01J 3/2823; G01J 2003/1247
See application file for complete search history.

(56) References Cited

U.S. PATENT DOCUMENTS 6,154,708 A * 11/2000 Koashi .............. G01J 3/433
                                            702/155
6,927,900 B2 * 8/2005 Liu .................. B32B 17/10862
                                            359/359
9,075,198 B2 * 7/2015 Shinto .................. G02B 5/28
(Continued)

FOREIGN PATENT DOCUMENTS

| JP | 2009204426 A | * | 9/2009 | |
| JP | 2014059250 A | * | 4/2014 | ............ G01J 3/0205 |

(Continued)

Primary Examiner — Paulinho E Smith
(74) Attorney, Agent, or Firm — CHIP LAW GROUP

(57) ABSTRACT

Provided is a determination method that includes obtaining measurement data, selecting one or more second wavelengths from a plurality of first wavelengths including at least one of a plurality of measurement wavelengths to generate a plurality of individuals, by using a genetic algorithm, inputting, to a first model learned to reproduce a correct answer label of a target object, the measurement data of the target object belonging to a remaining group and a second spectroscopic spectrum determined by the second wavelength to discriminate a label of the target object belonging to the remaining group, for each of the plurality of individuals, and determining whether or not to use the second wavelength as the wavelength of the spectroscopic spectrum for discrimination based on a rate at which the label is correctly discriminated.

9 Claims, 12 Drawing Sheets

(56) References Cited

U.S. PATENT DOCUMENTS

| | | | |
|---|---|---|---|
| 11,079,315 B2* | 8/2021 | Messerschmidt | G01N 33/49 |
| 11,587,491 B1* | 2/2023 | DeFilippis | H04N 9/3147 |
| 2001/0050792 A1* | 12/2001 | Yamane | H04J 14/02 |
| | | | 398/79 |
| 2002/0113966 A1* | 8/2002 | Shchegrov | H01L 22/20 |
| | | | 356/369 |
| 2003/0030801 A1* | 2/2003 | Levenson | G01J 3/0218 |
| | | | 356/326 |
| 2003/0123051 A1* | 7/2003 | McGrew | B82Y 10/00 |
| | | | 356/318 |
| 2004/0070772 A1* | 4/2004 | Shchegrov | G01N 21/47 |
| | | | 356/625 |
| 2005/0185188 A1* | 8/2005 | McGrew | B82Y 10/00 |
| | | | 356/450 |
| 2010/0027002 A1* | 2/2010 | Claps | G01N 21/65 |
| | | | 356/301 |
| 2012/0257280 A1* | 10/2012 | Sano | G01J 3/26 |
| | | | 359/578 |
| 2012/0274937 A1* | 11/2012 | Hays | G01S 17/95 |
| | | | 356/450 |
| 2014/0319351 A1* | 10/2014 | Yamada | G01N 21/8901 |
| | | | 250/339.02 |
| 2015/0316416 A1* | 11/2015 | Funamoto | G01J 3/45 |
| | | | 356/451 |
| 2016/0054284 A1* | 2/2016 | Washburn | G01N 21/718 |
| | | | 356/318 |
| 2016/0266034 A1* | 9/2016 | Helbley | G01N 33/0004 |
| 2017/0030776 A1* | 2/2017 | Inoue | G01J 11/00 |
| 2017/0059477 A1* | 3/2017 | Feitisch | G01J 3/42 |
| 2021/0381955 A1* | 12/2021 | Watanabe | G06N 3/12 |
| 2023/0076218 A1* | 3/2023 | Van Ingen Schenau | G03F 7/70558 |

FOREIGN PATENT DOCUMENTS

| | | | | |
|---|---|---|---|---|
| JP | 2015099239 A | * | 5/2015 | G01J 3/26 |
| JP | 2017203658 A | * | 11/2017 | |
| JP | 6260076 B2 | * | 1/2018 | G01J 3/0205 |
| JP | 2019168262 A | * | 10/2019 | F02D 31/004 |
| WO | WO-2011079323 A2 | * | 6/2011 | G01N 21/45 |

* cited by examiner

DETERMINATION METHOD

The present application is based on, and claims priority from JP Application Serial Number 2020-096980, filed Jun. 3, 2020, the disclosure of which is hereby incorporated by reference herein in its entirety.

BACKGROUND

1. Technical Field

The present disclosure relates to a technology for discriminating a target object by using a spectroscopic spectrum.

2. Related Art

In the related art, there is known a technology of irradiating an inspection target object with near-infrared light and determining whether or not the inspection target object is a normal product or an abnormal product by using a spectroscopic spectrum of reflected light from the inspection target object (JP-A-2017-203658).

In the technology in the related art, in order to improve discrimination accuracy, it is conceivable to increase the number of wavelengths of light constituting the spectroscopic spectrum. Meanwhile, when the number of wavelengths is increased, problems such as an increase in the amount of information to be acquired, a long discrimination time, and a long measurement time may occur. Further, even when the number of wavelengths is increased, there may be a problem that the discrimination accuracy is not improved. Therefore, there is a demand for a technology capable of improving determination accuracy while reducing occurrence of problems that occur in label discrimination using a spectroscopic spectrum.

SUMMARY (1) According to an aspect of the present disclosure, there is provided a determination method of a wavelength of a spectroscopic spectrum for discrimination, the determination method including: imaging each of a plurality of target objects at a plurality of measurement wavelengths to obtain measurement data; selecting 0 or more second wavelengths from a plurality of first wavelengths including at least one of the plurality of measurement wavelengths to generate a plurality of individuals, by using a genetic algorithm; inputting, to a first model learned to reproduce a correct answer label of the target object belonging to one group from the measurement data of the target object belonging to the one group and a first spectroscopic spectrum determined by the second wavelength, the measurement data of the target object belonging to the remaining group and a second spectroscopic spectrum determined by the second wavelength to discriminate a label of the target object belonging to the remaining group, for each of the plurality of individuals; and determining whether or not to use the second wavelength as the wavelength of the spectroscopic spectrum for discrimination based on a rate at which the label is correctly discriminated.

(2) According to another aspect of the present disclosure, there is provided a determination method of determining an irradiation condition of a light source to discriminate a label associated with a target object by using a spectroscopic spectrum for discriminating the target object. The determination method includes: selecting one irradiation condition from a plurality of the irradiation conditions to generate a plurality of individuals, by using a genetic algorithm; inputting, to a model learned to reproduce a correct answer label of the target object belonging to one group from a spectroscopic spectrum of the target object belonging to the one group acquired by using the irradiation condition represented by the individual, a spectroscopic spectrum of the target object belonging to the remaining group acquired by using the irradiation condition represented by the individual to discriminate a label of the target object belonging to the remaining group, for each of the plurality of individuals; and determining, regarding the discrimination of the label by using the model, whether or not to use the irradiation condition represented by the individual as the irradiation condition for obtaining the spectroscopic spectrum for discrimination, based on a rate at which the label is correctly discriminated.

DESCRIPTION OF EXEMPLARY EMBODIMENTS

A. First Embodiment

Figure 1:
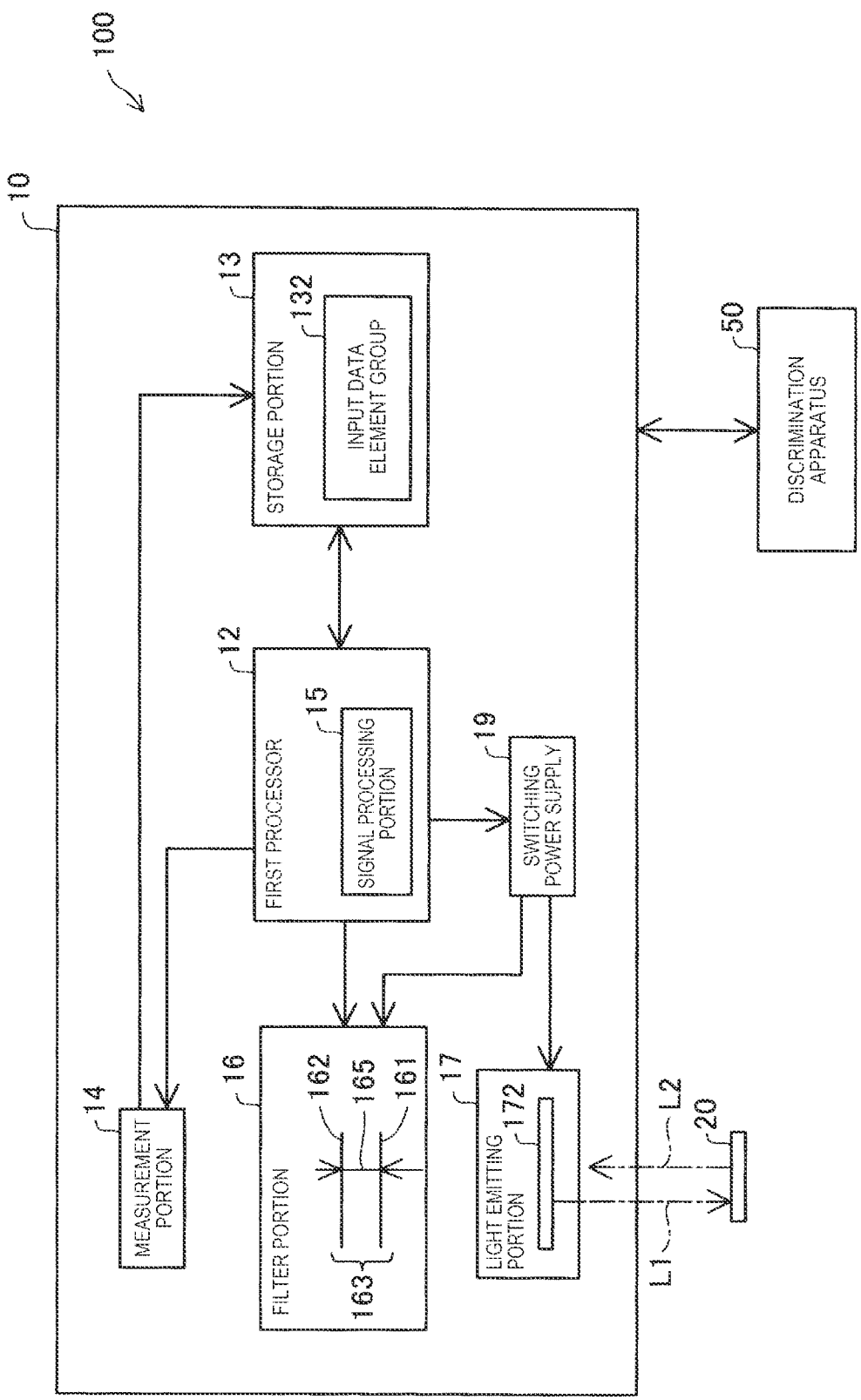
FIG. 1 is a diagram for explaining a discrimination system according to a first embodiment.

FIG. 1 is a diagram for explaining a discrimination system 100 according to a first embodiment. The discrimination system 100 is a system for discriminating a state of a target object 20 by using a spectroscopic spectrum for discrimination which is a spectroscopic spectrum obtained by imaging the target object 20. In the present embodiment, the discrimination system 100 discriminates whether the target object 20 is a non-defective product or a defective product. The target object 20 is, for example, a product manufactured in a factory or the like, and is a circuit substrate in the present embodiment. Further, the discrimination system 100 learns a first model 55, and uses the learned first model 55 to determine a spectroscopic spectrum for discrimination appropriate for label discrimination from spectroscopic spectra that can be generated. The discrimination system 100 includes a spectroscopic measurement apparatus 10 and a discrimination apparatus 50. The first model 55 changes for each selected individual, which will be described later, and for each wavelength selected in the present embodiment.

The spectroscopic measurement apparatus 10 extracts light having a specific wavelength from inspection target light L2 and acquires a spectroscopic spectrum for discrimination. The inspection target light L2 is generated by irradiating the target object 20 with inspection light L1 from a light source 172 and reflecting the inspection light L1 by the target object 20. The spectroscopic measurement apparatus 10 includes a first processor 12, a storage portion 13, a measurement portion 14, a filter portion 16, a light emitting portion 17, and a switching power supply 19.

The storage portion 13 is configured with a ROM, a RAM, or the like. Various programs for execution by the first processor 12 are stored in the storage portion 13. Further, the storage portion 13 stores a spectroscopic spectrum measured by the measurement portion 14 as an input data element group 132 in association with an identifier for identifying the imaged target object 20 and a correct answer label. The correct answer label is any one of a non-defective product label indicating an available state for shipment and a defective product label indicating an unavailable state for shipment. The correct answer label is labeled for each target object 20 by, for example, an inspector. A second processor 57, which will be described later, generates a data element group 42, which will be described later, from the input data element group 132. Details will be described later.

The first processor 12 controls an operation of the spectroscopic measurement apparatus 10 by executing the various programs stored in the storage portion 13. The first processor 12 may be configured with at least one of a software and a hardware circuit, and the operation of the spectroscopic measurement apparatus 10 may be controlled by the hardware circuit instead of the software. The first processor 12 has a signal processing portion 15. The signal processing portion 15 generates a spectroscopic spectrum by using light extracted by a tunable interference filter 163. Specifically, the signal processing portion 15 performs an arithmetic-operation process on a data element of a spectroscopic image captured by the measurement portion 14 to be described later and stored in the storage portion 13 to obtain a spectroscopic spectrum in each pixel. The obtained spectroscopic spectrum is stored in the storage portion 13.

The light emitting portion 17 irradiates the target object 20 with the inspection light L1 according to a command of the first processor 12. The light emitting portion 17 has a plurality of light sources 172. The plurality of light sources 172 are attached to a ring-shaped support member at regular intervals. Each of the plurality of light sources 172 can emit, for example, white light as the inspection light L1. In another embodiment, the plurality of light sources 172 may have a light source that emits green light, a light source that emits red light, and a light source that emits blue light.

The switching power supply 19 supplies power to the light emitting portion 17 according to a command from the first processor 12. The switching power supply 19 can individually supply power to each of the plurality of light sources 172.

The filter portion 16 has the tunable interference filter 163. The tunable interference filter 163 is also called an etalon filter. As the tunable interference filter 163, a well-known technology, for example, a technology disclosed in JP-A-2014-71400 can be adopted. That is, the tunable interference filter 163 includes a first optical film 161, and a second optical film 162 that faces the first optical film 161 via a gap 165. The first optical film 161 and the second optical film 162 each have both reflection characteristics and transmission characteristics for light in a desired wavelength bandwidth. The second optical film 162 is configured to be displaceable in a direction facing the first optical film 161. The size of the gap 165 can be changed by displacing the second optical film 162. The displacement of the second optical film 162 is realized by, for example, an electrostatic actuator. By adjusting a size of the gap 165, it is possible to extract light having a specific wavelength from the inspection target light L2 by passing the light. In the tunable interference filter 163, as the gap 165 increases, a wavelength of the light to be extracted also changes continuously. That is, there is a correlation relationship between the size of the gap 16 and the size of the wavelength to be extracted.

The measurement portion 14 is configured with, for example, a CCD camera or the like, and images the light extracted by the filter portion 16. Further, the imaged light is stored in the storage portion 13 as a spectroscopic image. For the accumulated spectroscopic image, the signal processing portion 15 performs an arithmetic-operation process on a data element of each pixel to generate a spectroscopic spectrum in each pixel. The spectroscopic spectrum is a data element that indicates an intensity for each specific wavelength. The spectroscopic spectrum for each pixel is added for each wavelength and stored as a spectroscopic spectrum of the target object 20 as a part of the input data element group 132. In still another embodiment, the measurement portion 14 may be configured with a point spectroscope or the like.

The discrimination apparatus 50 is a computer such as a personal computer. The discrimination apparatus 50 discriminates a state of the target object 20 by using the spectroscopic spectrum for discrimination. In the present embodiment, the discrimination apparatus 50 discriminates whether the target object 20 is a non-defective product or a defective product by using the spectroscopic spectrum for discrimination. Further, the discrimination apparatus 50 determines a wavelength of the spectroscopic spectrum for discrimination to be used for discrimination. The discrimination apparatus 50 is configured to enable data communication with the spectroscopic measurement apparatus 10 via wired or wireless communication.

Figure 2:
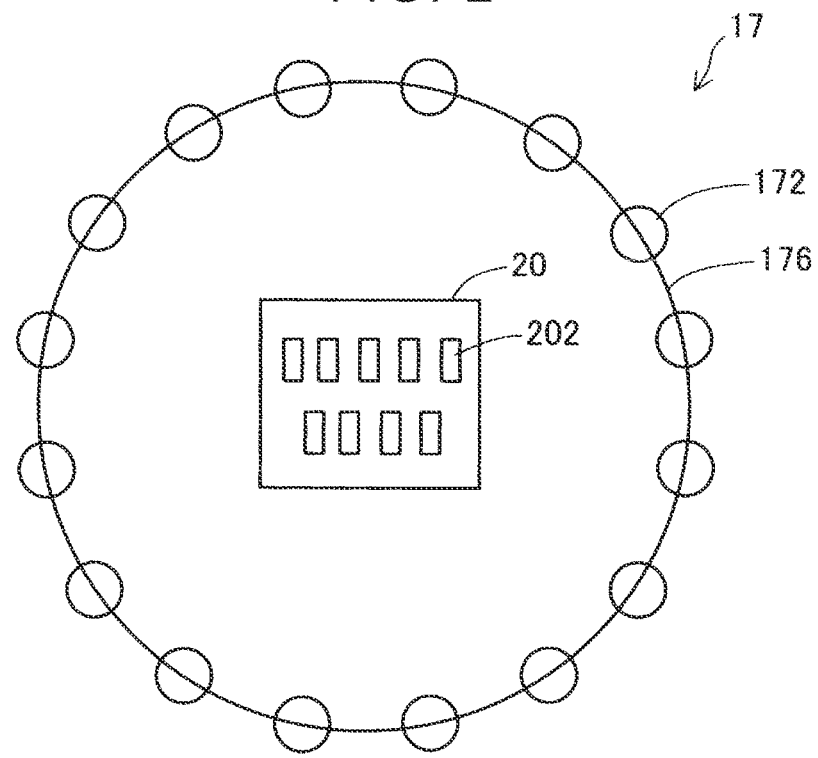
FIG. 2 is a diagram for explaining a light emitting portion.

FIG. 2 is a diagram for explaining the light emitting portion 17. In FIG. 2, the light emitting portion 17 and the target object 20 are viewed from directly above. The light emitting portion 17 includes a ring-shaped support member 176 and the plurality of light sources 172 arranged in the support member 176. The target object 20 is irradiated with the inspection light L1 by the light source 172. The measurement portion 14 and the filter portion 16 illustrated in FIG. 1 are arranged directly above the light emitting portion 17. The light emitting portion 17 is not limited to this configuration, and may have another configuration as long as the light emitting portion 17 has a light source capable of emitting the inspection light L1. A plurality of terminals 202 are arranged on a surface of the target object 20 which is a circuit substrate.

Figure 3:
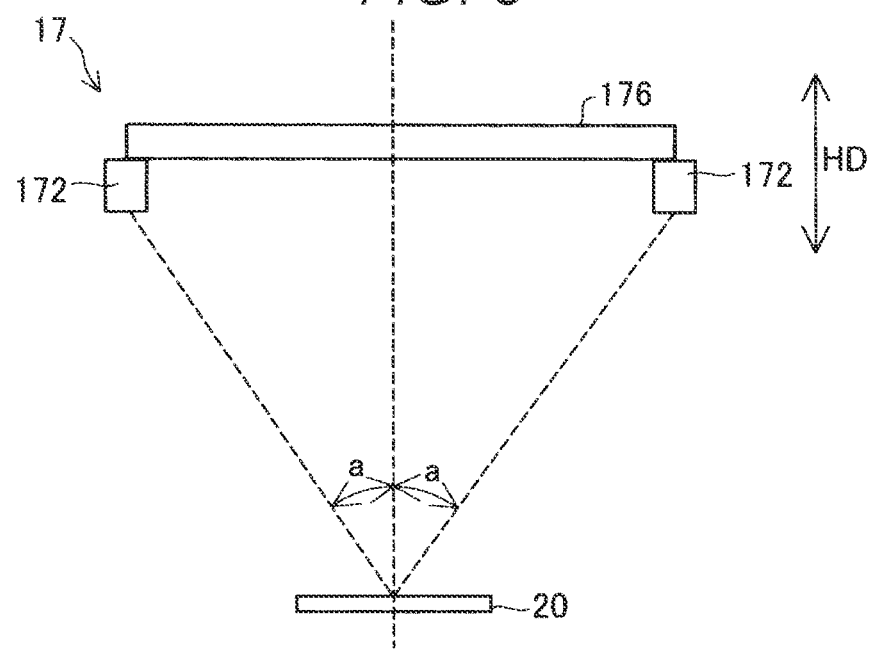
FIG. 3 is a diagram for further explaining the light emitting portion.

FIG. 3 is a diagram for further explaining the light emitting portion 17. The light emitting portion 17 further has an actuator for displacing a position of a height direction HD. As a result, an angle a, which is an index of a height of the light emitting portion 17, can be changed. The higher the position of the light source 172, the smaller the angle a. In the present embodiment, irradiation conditions when acquiring the spectroscopic spectrum are identical with each other. That is, the angles a, irradiation directions indicating which light source 172 is used, and brightness of the light source 172 are identical with each other.

Figure 4:
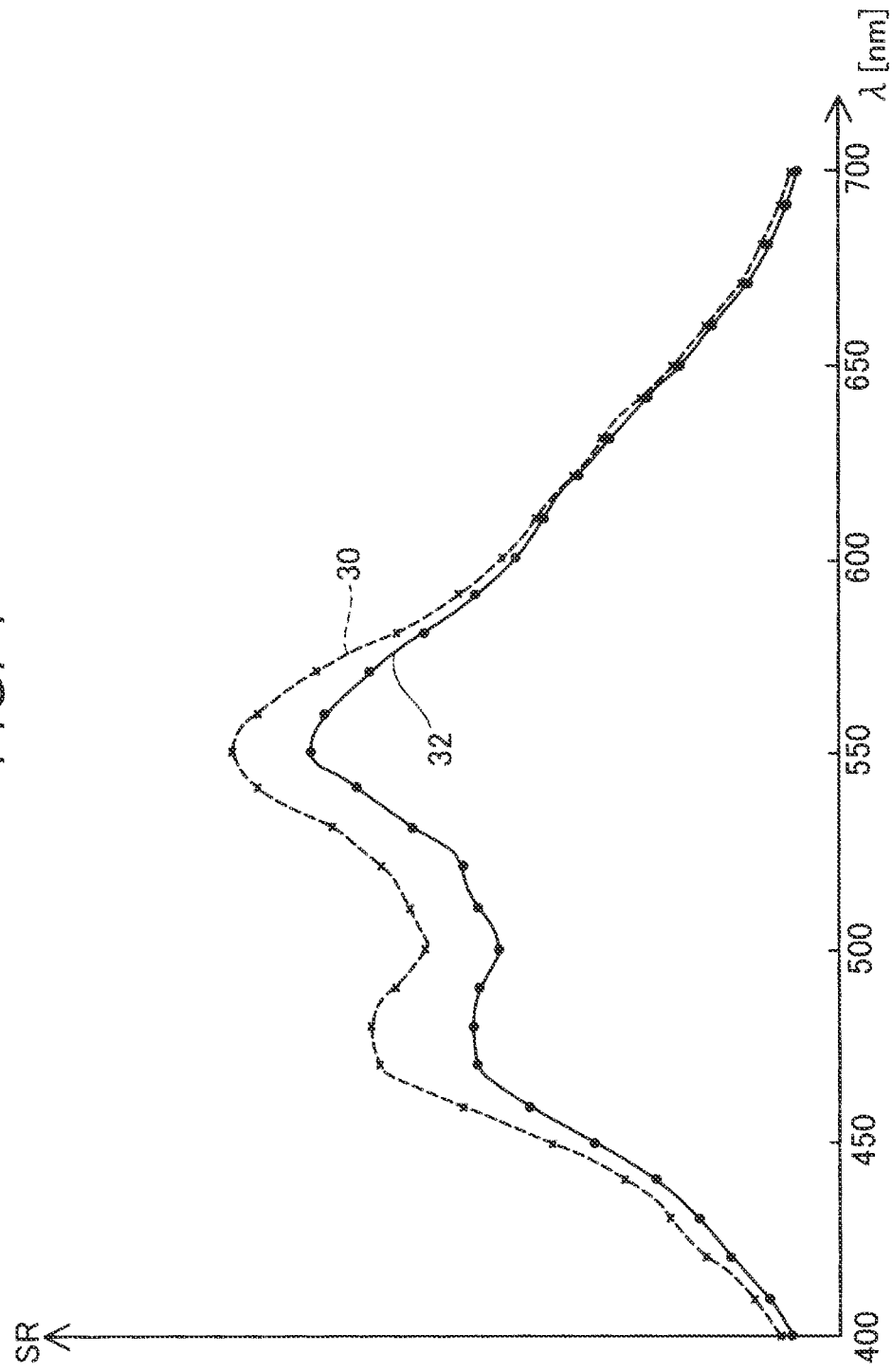
FIG. 4 is a diagram illustrating an example of spectroscopic spectra of a non-defective product and a defective product.

FIG. 4 is a diagram illustrating an example of spectroscopic spectra of a non-defective product and a defective product. The horizontal axis in FIG. 4 is a wavelength, and the vertical axis is spectroscopic reflectance SR representing a light intensity. FIG. 4 illustrates a line coupling spectroscopic spectra of specific 31 wavelengths set by the filter portion 16 in a wavelength range of 400 nm to 700 nm. As illustrated in FIG. 4, in a spectroscopic spectrum 30 obtained from the non-defective product target object 20 and a spectroscopic spectrum 32 obtained from the defective product target object 20, there are wavelengths in which the spectroscopic reflectance SR is significantly different from other wavelengths. Among the 31 wavelengths, a discriminant wavelength having the spectroscopic reflectance SR having a significant difference is specified, and a spectroscopic spectrum of the discriminant wavelength is used, so that it is possible to efficiently discriminate a non-defective product or a defective product. In the present embodiment, the 31 wavelengths have intervals of 10 nm such as 400 nm, 410 nm, and 420 nm. Each wavelength constituting the spectroscopic spectrum means, for example, a wavelength having the highest light intensity among wavelengths of light. In FIG. 4, the spectroscopic spectra 30 and 32 of the non-defective product and the defective product are illustrated one by one as an example, and when the spectroscopic spectra 30 and 32 are generated for each target object 20 of a plurality of non-defective products and each target object 20 of a plurality of defective products, the spectroscopic reflectance SR of the spectroscopic spectra 30 and 32 varies slightly depending on a state of the non-defective product or the defective product.

Figure 5:
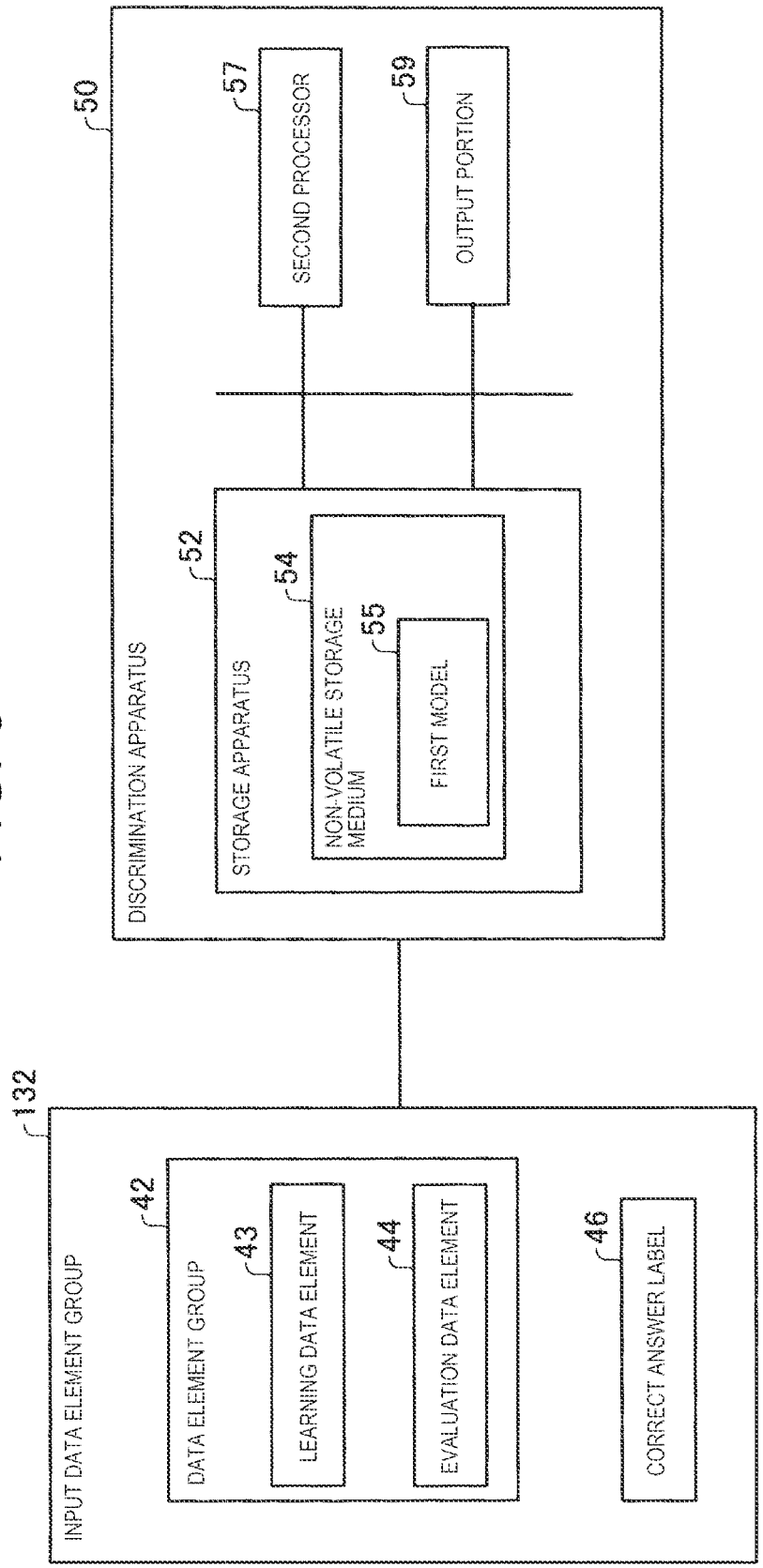
FIG. 5 is a diagram for explaining a discrimination apparatus.

FIG. 5 is a diagram for explaining the discrimination apparatus 50. The discrimination apparatus 50 discriminates a state of the target object 20 by using a spectroscopic spectrum for discrimination of the target object 20 acquired by the spectroscopic measurement apparatus 10. The spectroscopic spectrum for discrimination of the target object 20 is configured with a wavelength predetermined by the discrimination apparatus 50. In the present embodiment, the discrimination apparatus 50 discriminates whether the target object 20 is a non-defective product or a defective product. The discrimination apparatus 50 includes a storage apparatus 52, the second processor 57, and an output portion 59.

The storage apparatus 52 includes a non-volatile storage medium 54 as a non-temporary storage medium such as a flash memory or an EEPROM. The non-volatile storage medium 54 has the first model 55 generated by learning. The first model 55 is an algorithm for discriminating the state of the target object 20 by using the spectroscopic spectrum for discrimination acquired by the discrimination apparatus 50. In the present embodiment, the first model 55 uses Fisher linear discrimination and Mahalanobis distance as algorithms. In still another embodiment, the first model 55 may use a neural network type algorithm such as deep learning.

The second processor 57 controls an operation of the discrimination apparatus 50 by executing various programs stored in the storage apparatus 52. The second processor 57 may be configured with at least one of a software and a hardware circuit. The output portion 59 is used to output various types of information. The output portion 59 is, for example, a liquid crystal monitor. The various information is, for example, a result of discrimination using the learned first model 55. The output portion 59 may be a speaker that outputs sound instead of a display apparatus such as a liquid crystal monitor.

The input data element group 132 to be used for learning the first model 55 has the data element group 42 and a correct answer label 46. Although the input data element group 132 is stored in the spectroscopic measurement apparatus 10, the input data element group 132 may be stored in the storage apparatus 52 of the discrimination apparatus 50 or may be stored in another external storage apparatus. The data element group 42 is a spectroscopic spectrum of a second wavelength selected from a plurality of first wavelengths included in the inspection target light L2, for a plurality of target objects 20. The first wavelength is 31 wavelengths spectrally dispersed by the filter portion 16. When the 31 wavelengths are distinguished and used, $\lambda 1$ to $\lambda 31$ are used. The wavelength becomes longer from $\lambda 1$ to $\lambda 31$. The correct answer label 46 is a label attached to each target object 20 by an inspector, and is any one of a non-defective product label and a defective product label. The inspector visually associates the correct answer label 46 with the target object 20, for example. The data element group 42 is divided into a learning data element 43 to be used for learning the first model 55 by, for example, the second processor 57, and an evaluation data element 44 to be used for evaluating performance of the learned first model 55. The number of wavelengths of the spectroscopic spectrum, which is each data element of the data element group 42, corresponds to, for example, the number of dimensions of Fisher linear discrimination.

Figure 6:
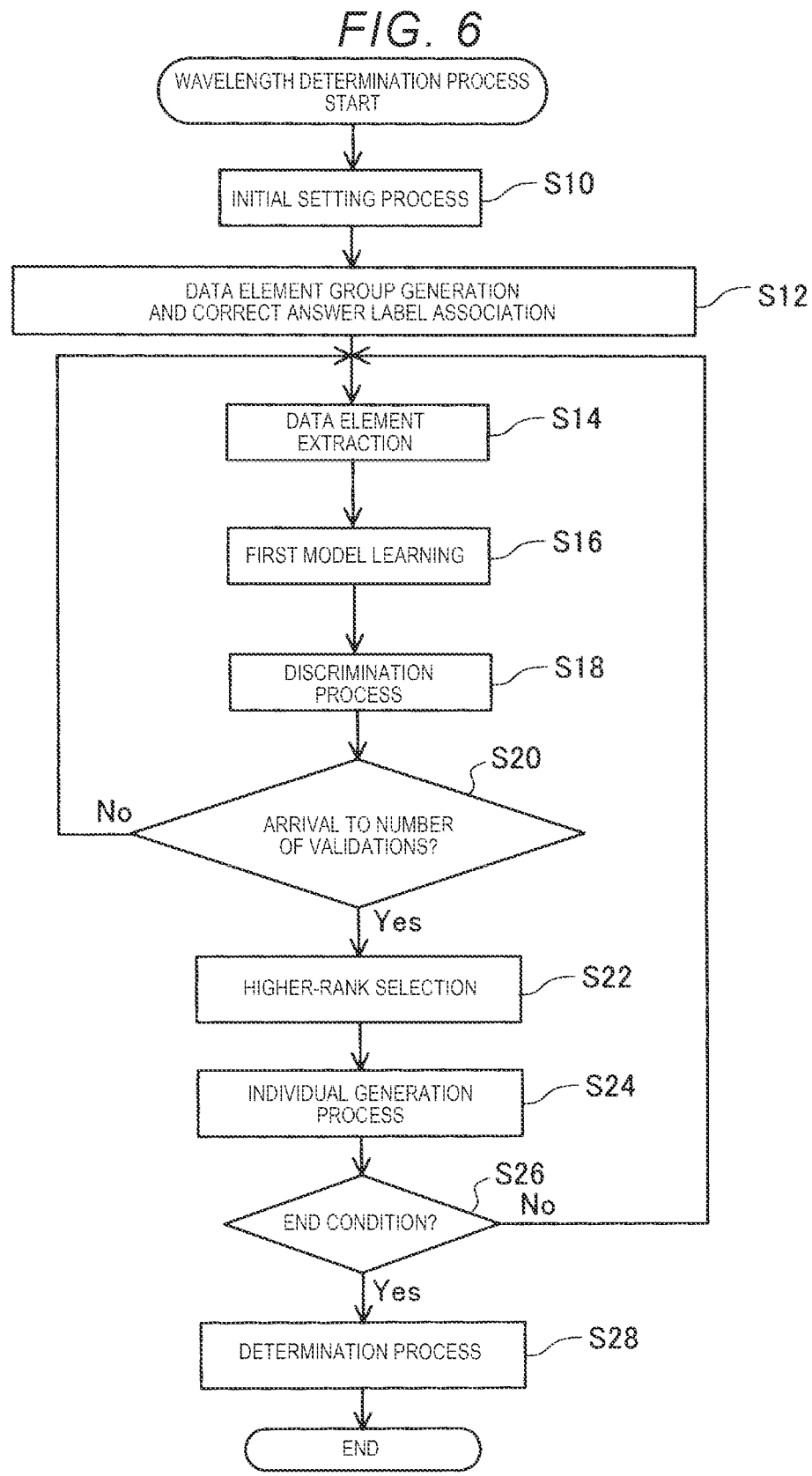
FIG. 6 is a flowchart illustrating a wavelength determination process of light constituting a spectroscopic spectrum for discrimination.
Figure 7:
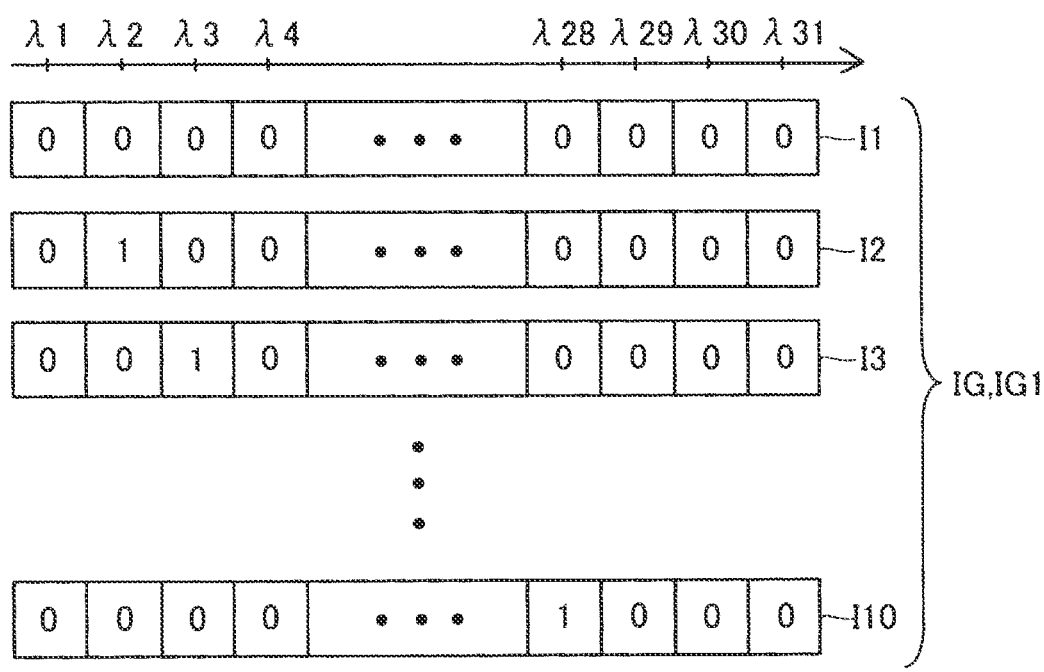
FIG. 7 is a diagram for explaining step S10 in FIG. 6.
Figure 8:
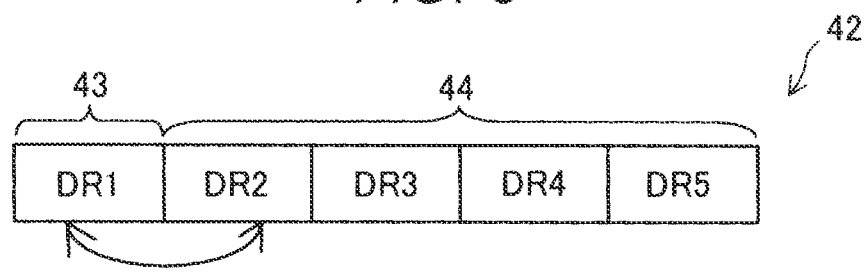
FIG. 8 is a diagram for explaining step S20 in FIG. 6.
Figure 9:
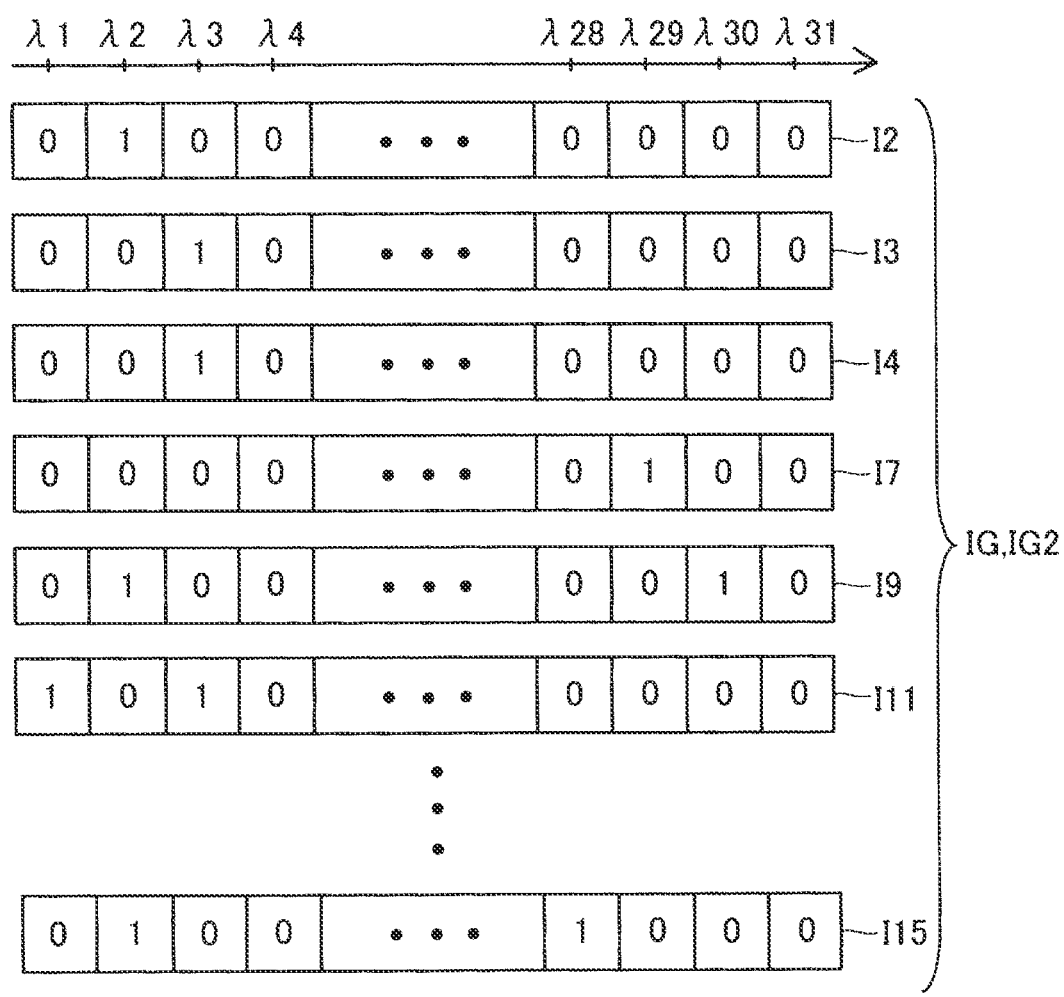
FIG. 9 is a diagram for explaining step S22 and step S24 in FIG. 6.

FIG. 6 is a flowchart illustrating a wavelength determination process of light constituting a spectroscopic spectrum for discrimination. FIG. 7 is a diagram for explaining step S10 in FIG. 6. FIG. 8 is a diagram for explaining step S20 in FIG. 6. FIG. 9 is a diagram for explaining step S22 and step S24 in FIG. 6. By setting the gap 165 depending on a wavelength determined by the wavelength determination process illustrated in FIG. 6, a spectroscopic spectrum for discrimination determined by the wavelength determined by the signal processing portion 15 illustrated in FIG. 1 is generated from the inspection target light L2. That is, the spectroscopic spectrum for discrimination is obtained from the target object 20. In addition, the first model 55 discriminates a label associated with the target object 20, that is, whether the target object 20 is a non-defective product or a defective product, by using the spectroscopic spectrum for discrimination.

As illustrated in FIG. 6, first, in step S10, an initial setting process is executed. In the initial setting process, first, the first processor 12 images each of the plurality of target objects 20 at a plurality of measurement wavelengths to obtain measurement data. The plurality of measurement wavelengths are wavelengths included in the inspection target light L2, and in the present embodiment, are wavelengths of the wavelengths $\lambda 1$ to $\lambda 31$. Specifically, for each of the plurality of target objects 20, the gap 165 of the filter portion 16 is adjusted, and the wavelengths of the wavelengths $\lambda 1$ to $\lambda 31$ are extracted and imaged by the measurement portion 14. The signal processing portion 15 obtains measurement data by generating a spectroscopic spectrum for each target object 20 based on light imaged by the measurement portion 14. The number of target objects 20 is, for example, 3000.

Further, in step S12, as illustrated in FIG. 7, the second processor 57 uses a genetic algorithm to select 0 or more second wavelengths and to generate a population IG configured with a plurality of individuals I1 to I10 as a data element group 42, from a plurality of first wavelengths $\lambda 1$ to $\lambda 31$ including at least one of a plurality of measurement wavelengths. Further, in step S12, the correct answer label 46 is associated with each of the target objects 20. In FIG. 7, the selected wavelength is represented by "1", and the unselected wavelength is represented by "0". The number of individuals generated in step S12 is 10. The second processor 57 generates 10 individuals I1 to I10 having different genes, that is, selection contents of wavelengths. The first 10 individuals I1 to I10 are also referred to as a current generation population IG1. The current generation population IG1 may include the individual I1 in which all wavelengths λ1 to λ31 are not selected as initial values. Further, for the current generation population IG1, one wavelength to be selected may be randomly determined for the other individuals I. When the individual of the genetic algorithm of the present embodiment is used without distinguishing, the individual I is used. In the present embodiment, the plurality of measurement wavelengths and the first wavelengths λ1 to λ31 are the same wavelength. In still another embodiment, the first wavelengths λ1 to λ31 may be wavelengths configured with at least one of the plurality of measurement wavelengths, and may include a wavelength different from the plurality of measurement wavelengths. Further, a step of obtaining the measurement data to be executed in step S10 may be executed after the data element group 42 in step S12 is generated.

Next, in step S14, the second processor 57 extracts the learning data element 43 as one group to be used for learning the first model 55, and the evaluation data element 44 as a remaining group to be used for performance evaluation of the first model 55 after the learning, from the data element group 42 generated in step S12. In the present embodiment, as illustrated in FIG. 8, the data element group 42 generated for each of the individuals I1 to I10 is divided into a plurality of data areas DR1 to DR5. A data area occupying 20% is extracted as the learning data element 43, and a data area occupying the remaining 80% is extracted as the evaluation data element 44. In FIG. 8, the data area DR1 is extracted as the learning data element 43, and the data areas DR2 to DR5 are extracted as the evaluation data element 44.

As illustrated in FIG. 6, next, in step S16, the second processor 57 learns the first model 55 by using the learning data element 43 extracted in step S14 as an input element. In the present embodiment, the first model 55 has Fisher linear discrimination as an algorithm. Therefore, in step S16, the second processor 57 determines a projection direction w in which the correct answer label 46 maximizes the degree of separation between a data element group of a non-defective product label and a data element group of a defective product label for each of the individuals I1 to I10. The second processor 57 stores a parameter representing the determined projection direction w in the storage apparatus 52. As described above, in step S16, for each of the plurality of individuals I1 to I10, the second processor 57 learns the first model 55 so as to reproduce the correct answer label of the target object 20 belonging to one group, from the measurement data of the target object 20 belonging to the learning data element 43 as the one group and a first spectroscopic spectrum as a spectroscopic spectrum determined by the second wavelength.

Next, in step S18, the second processor 57 inputs the evaluation data element 44 as the remaining group corresponding to each of the individuals I1 to I10 to each first model 55 learned based on the spectroscopic spectrum of the second wavelength selected for each of the individuals I1 to I10 so as to discriminate the labels of the plurality of target objects 20 corresponding to each data element of the evaluation data element 44. That is, in step S18, the second processor 57 inputs the measurement data of the target object 20 belonging to the evaluation data element 44, which is the remaining group, and the second spectroscopic spectrum determined by the second wavelength to the first model 55 so as to discriminate the label of the target object 20 belonging to the remaining group. Step S18 is executed by calculating the Mahalanobis distance. Specifically, each data element of the evaluation data element 44 is projected in the projection direction w by using a parameter representing the projection direction w determined by learning of the first model 55 to generate a feature amount. In step S18, for each data element of the evaluation data element 44, the Mahalanobis distance is calculated from the generated feature amount, and a class closer to a distance from a learning data element group which is a defective product or a distance from a learning data element group which is a non-defective product is discriminated as the label of the evaluation data element 44. This manner is applied for each of the individuals I1 to I10. A discrimination rate, which is a discrimination result in step S18, is calculated by the second processor 57 and stored in the non-volatile storage medium 54. The discrimination rate is a ratio of the number of correctly discriminated labels to the number of evaluation data elements 44 input to the first model 55, for each of the first models 55 according to the individuals I1 to I10, and is a percentage. In the present embodiment, the discrimination process in step S18 is respectively performed according to the number of the first models 55 generated according to the individuals I1 to I10. Further, as described above, in step S18, for each combination of the second wavelengths corresponding to the individuals I1 to I10, the spectroscopic spectrum of the target object 20 configured with the second wavelength used for learning the first model 55 is input to the first model 55 learned by using the learning data element 43, and the label is discriminated. In this manner, the first model 55 is learned for each of the individuals I1 to I10, and the labels are discriminated by using these first models 55, so that it is possible to accurately calculate the discrimination rate. As a result, evaluation of label discrimination using the first model 55 executed in step S22, which will be described later, can be performed more accurately.

Next, in step S20, the second processor 57 determines whether or not step S14 to step S18 have been executed at each of the number of validations. In the present embodiment, it is determined whether or not each of the five divided data areas DR1 to DR5 illustrated in FIG. 8 was used as the learning data element 43. That is, when step S14 to step S18 have been executed by using the data area DR1 as the learning data element 43, step S14 to step S18 are executed by using the next data area DR2 as the learning data element 43. In this manner, step S14 to step S18 are repeatedly executed until all the data elements of the data areas DR1 to DR5 are used as the learning data elements 43.

When "Yes" is determined in step S20, step S22 in FIG. 6 is executed. In step S22, the second processor 57 selects the higher-ranked individual I having a higher evaluation value, which is a value of an evaluation function L, among the respective individuals I1 to I10 constituting the current generation population IG1. The evaluation function L is represented by the following equation (1).

Evaluation function $L$=average discrimination rate$\times \alpha + WN \times (1-\alpha)$ (1)

Here, α is a weighting coefficient, which is a value equal to or more than 0 and equal to or less than 1. The average discrimination rate is an average value of discrimination rates calculated in step S18 at each time in validation for each of the individuals I1 to I10. α may be a value larger than 0 and smaller than 1. WN is an index related to the number of wavelengths of the second wavelength and is represented by the following equation (2). In still another embodiment, in the above equation (1), instead of the average discrimination rate, a maximum discrimination rate, which is a maximum value of the discrimination rate calculated in step S18 at each validation, or a minimum discrimination rate, which is a minimum value of the discrimination rate calculated in step S18 at each validation may be used.

$$WN=(\text{number of wavelengths of first wavelength}-\text{number of wavelengths of second wavelength})\times 100/\text{number of wavelengths of first wavelength} \quad (2)$$

In the present embodiment, as represented by the above equations (1) and (2), the evaluation function L is a function represented by a first term using the discrimination rate as a ratio and a second term using the number of wavelengths of the second wavelength. Further, an evaluation value of the evaluation function L becomes higher as the discrimination rate as a ratio is higher when the other terms have the same value, and becomes higher as the number of wavelengths of the second wavelength is smaller when the other terms have the same value. In step S22, the second processor 57 selects the higher-ranked 5 individuals having a higher evaluation value of the evaluation function, among the 10 individuals I1 to I10. In the example illustrated in FIG. 9, the individuals I2, I3, I4, I7, and I9 are the higher-ranked 5 individuals. As described above, the evaluation function L is a function represented by the first term using the discrimination rate as a ratio and the second term using the number of wavelengths of the second wavelength. As a result, it is possible to determine whether or not to use the second wavelength as a wavelength of the spectroscopic spectrum for discrimination, in consideration of the correctly discriminated rate and the number of wavelengths of the second wavelength. Here, the evaluation value of the evaluation function L becomes higher as the discrimination rate is higher, and becomes higher as the number of wavelengths of the second wavelength is smaller. As a result, by selecting the second wavelength represented by the individual I having a high evaluation value as a wavelength of the spectroscopic spectrum for discrimination, it is possible to determine the spectroscopic spectrum for discrimination in which the number of wavelengths is reduced while improving accuracy of label discrimination.

As illustrated in FIG. 6, in step S24, the second processor 57 generates five new individuals I instead of the lower-ranked five individuals I which are not selected in step S22. In step S24, the second processor 57 generates a new individual I, by using mutations or crossovers, for example. In the present embodiment, the second processor 57 generates a new individual I by mutating one wavelength or two wavelengths. In the example illustrated in FIG. 9, new individuals I11 to I15 are generated in step S24. A population generated next to the individual IG1 is called a next generation population IG2.

As illustrated in FIG. 6, in step S26, the second processor 57 determines whether or not an end condition is satisfied. The end condition is a condition that the individual I having the highest evaluation value calculated by the evaluation function L in a predetermined number of continuous generations is the same without a change. In the present embodiment, the predetermined number of continuous generations is 50. That is, step S22 is repeatedly executed, and when the individual I having the highest evaluation value is the same in continuous 50 times, it is determined that the end condition is satisfied. When the end condition is satisfied, the second processor 57 executes a determination process in step S28. In the determination process, the second processor 57 determines to use the second wavelength represented by the individual I having the highest evaluation value when the end condition is satisfied in step S26 as the wavelength of the spectroscopic spectrum for discrimination, and data indicating the second wavelength is stored in the storage apparatus 52.

On the other hand, when the second processor 57 determines that the end condition is not satisfied in step S26, the second processor 57 regards the next generation population IG2 as the current generation population, and performs step S14 to step S22. Regarding the individuals I2, I3, I4, I7, and I9 on which step S14 to step S20 are already executed in the previous routine, the second processor 57 may omit step S14 to step S20 in this routine, and may execute step S14 to step S20 only for new individuals I11 to I15. That is, the second processor 57 extracts the learning data element 43 and the evaluation data element 44 associated with the correct answer label in step S14 for the newly generated individuals I11 to I15. In the same manner as in step S16 described above, for each of the learning data elements 43 corresponding to the individual I11 to I15, the second processor 57 determines the projection direction w in which the correct answer label 46 has the maximum degree of separation between a data element group of a non-defective product label and a data element group of a defective product label, and stores a parameter representing the determined projection direction w in the storage apparatus 52. Next, in the same manner as in step S18 described above, the second processor 57 inputs the evaluation data element 44 as the remaining group to the first models 55 according to the individuals I11 to I15 so as to discriminate labels of the plurality of target objects 20. Further, the second processor 57 determines whether or not step S14 to step S18 have been executed at each of the number of validations, for the newly generated individuals I11 to I15, in the same manner as in step S20 described above. When the number of validations satisfies a condition in step S20, step S22 is executed for the next generation population IG2, and the next generation individual I is generated in step S24.

In step S22 to step S28 described above, for discriminating the label by using the first model 55, the second processor 57 determines whether or not to use the second wavelength as the wavelength of the spectroscopic spectrum for discrimination based on a rate at which the label is correctly discriminated. Further, in step S22 to step S28 described above, the second processor 57 calculates an evaluation value for each combination of the second wavelengths represented by the individual I by the evaluation function L. Further, the second processor 57 uses the calculated evaluation value to determine whether or not to use the second wavelength represented by any individual I as the wavelength of the spectroscopic spectrum for discrimination.

The spectroscopic spectrum for discrimination determined by the wavelength determination process is used to discriminate a state of the manufactured target object 20, that is, a non-defective product or a defective product in the present embodiment. Specifically, a size of the gap 165 of the tunable interference filter 163 illustrated in FIG. 1 is adjusted so as to extract light of each wavelength constituting the spectroscopic spectrum for discrimination from the inspection target light L2. For example, when the wavelengths constituting the spectroscopic spectrum for discrimination are 10 wavelengths, the size of the gap 165 corresponding to each wavelength is set in time series, and each wavelength is extracted from the filter portion 16. The measurement portion 14 acquires the extracted light of each wavelength, and the signal processing portion 15 generates a spectroscopic spectrum for discrimination. The generated spectroscopic spectrum for discrimination is input to the first model 55 to be learned by using the corresponding spectroscopic spectrum to execute label discrimination.

Figure 10:
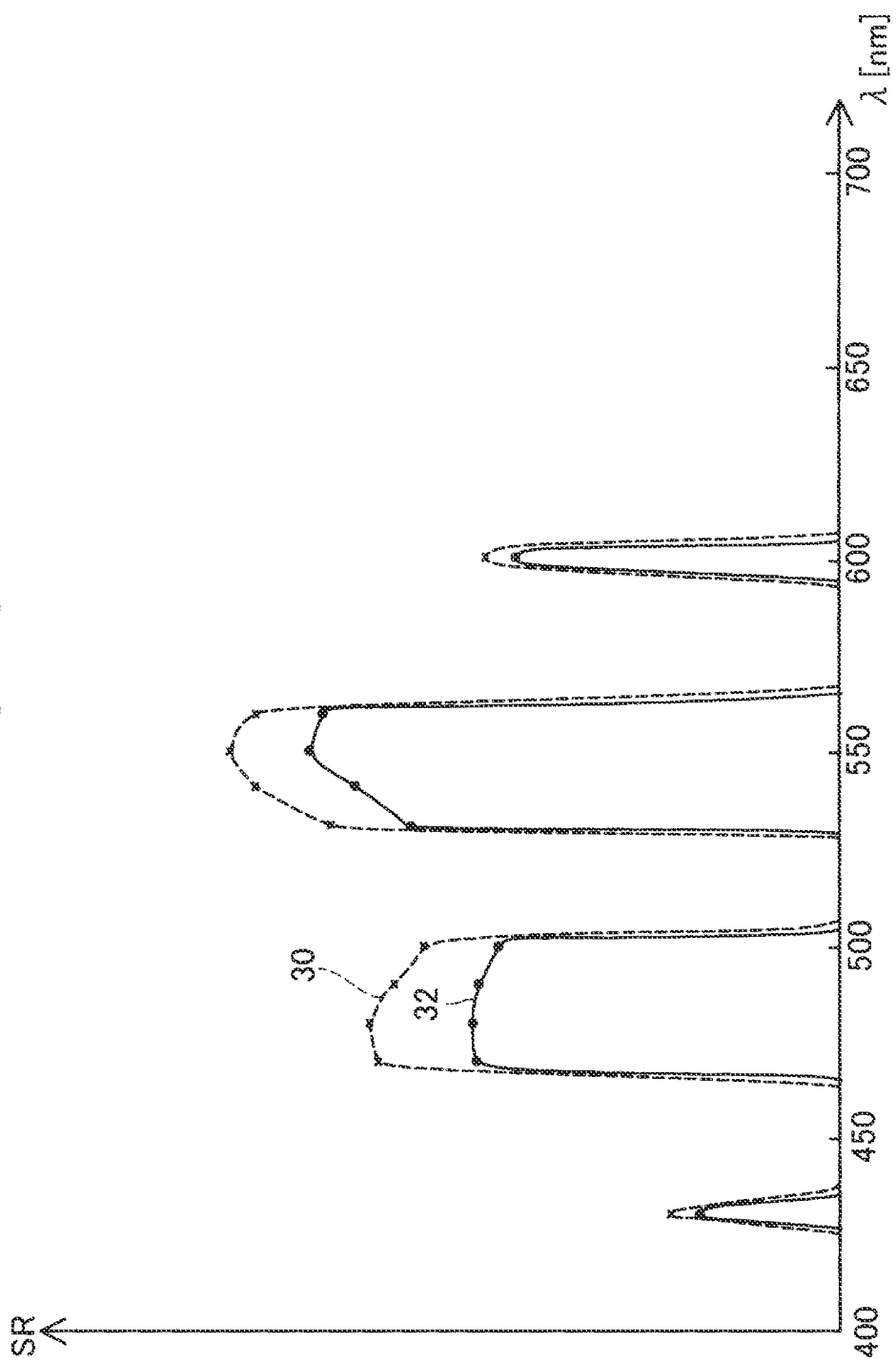
FIG. 10 is a diagram illustrating a spectroscopic spectrum for discrimination.

FIG. 10 is a diagram illustrating an example of a spectroscopic spectrum for discrimination generated by acquiring a second wavelength determined by a wavelength determination process from the non-defective product target object 20 and the defective product target object 20. In the present embodiment, for example, in the wavelength determination process, the second wavelength having 10 wavelengths is determined from the first wavelength having 31 wavelengths. By using a spectroscopic spectrum of the determined second wavelength, a high discrimination rate can be achieved in the first model 55 while reducing the number of wavelengths.

According to the first embodiment, regarding discrimination of the label using the first model 55, by determining whether or not to use the second wavelength represented by the individual I as the wavelength of the spectroscopic spectrum based on the rate at which the label is correctly discriminated, it is possible to determine the second wavelength constituting the spectroscopic spectrum for discrimination from the first wavelength. As a result, it is possible to suppress a decrease in discrimination accuracy for a label while suppressing an increase in the number of wavelengths of a spectroscopic spectrum for discrimination.

In the first embodiment, the evaluation function L is not limited to the above. For example, an evaluation function La represented in the following equation (3) may be used instead of the evaluation function L.

$$\text{Evaluation function } La = \text{average discrimination rate} \times \alpha + WN \times \beta + (1/\text{dispersion of selected wavelength}) \times \gamma \quad (3)$$

Here, $\alpha$, $\beta$, and $\gamma$ are weighting coefficients, and are set so that a total value is 1, for example. The "selected wavelength" is a wavelength marked with "1" in the individual I, that is, a selected wavelength. In still another embodiment, in the above equation (3), the minimum discrimination rate or the maximum discrimination rate may be used instead of the average discrimination rate.

The evaluation function La of the equation (3) is different from the evaluation function L of the first embodiment, and further includes a third term using dispersion of each wavelength of the second wavelength. Further, the evaluation value of the evaluation function La becomes higher as the dispersion of the selected wavelength is smaller when the first term and the second term, which are the other terms, are constant values. As a result, it is possible to determine whether or not to use the second wavelength as the wavelength of the spectroscopic spectrum for discrimination in consideration of the dispersion of each wavelength of the second wavelength. In particular, the evaluation function La has a higher evaluation value as the dispersion is smaller, so that a combination of the second wavelengths represented by the individual I having a smaller dispersion can be determined as the wavelength of the spectroscopic spectrum for discrimination. Here, in the spectroscopic measurement apparatus 10, it is necessary to adjust the gap 165 to extract the wavelength, and when dispersion of the extracted wavelength is large, displacement of the second optical film 162 takes time and an acquisition and generation time of the spectroscopic spectrum for discrimination becomes longer. According to the present embodiment, since the second wavelength having a small dispersion is determined as the wavelength of the spectroscopic spectrum for discrimination, it is possible to reduce an adjustment time of the gap 165 for generating the spectroscopic spectrum for discrimination. As a result, the time for acquiring and generating the spectroscopic spectrum for discrimination can be shortened, so that a discrimination time for the label can also be shortened.

B. Second Embodiment

Figure 11:
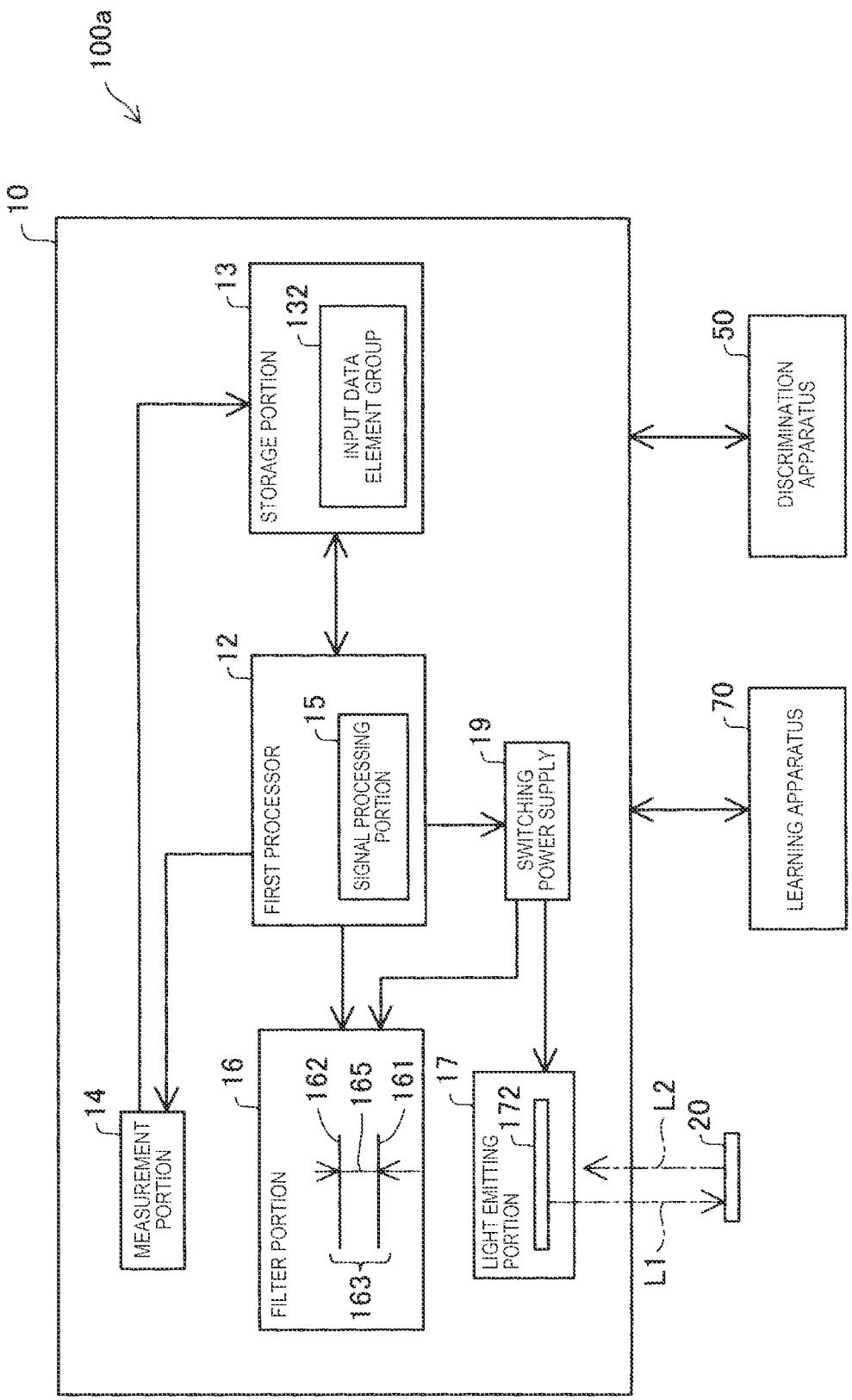
FIG. 11 is a diagram for explaining a discrimination system according to a second embodiment.

FIG. 11 is a diagram for explaining a discrimination system 100a according to a second embodiment. A difference between the discrimination system 100 illustrated in FIG. 1 and the discrimination system 100a is that the discrimination system 100a newly includes a learning apparatus 70. Since other configurations have the same manner as those of the discrimination system 100 according to the first embodiment, the same reference numerals are given and description thereof will be omitted. The learning apparatus 70 is a computer such as a personal computer. In still another embodiment, the learning apparatus 70 and the discrimination apparatus 50 may be configured as the same apparatus. The learning apparatus 70 is used to determine an irradiation conditions of the spectroscopic measurement apparatus 10 capable of improving discrimination accuracy when discriminating a label of the target object 20. The learning apparatus 70 is configured to be capable of data communication with the spectroscopic measurement apparatus 10 by wire or wirelessly.

Figure 12:
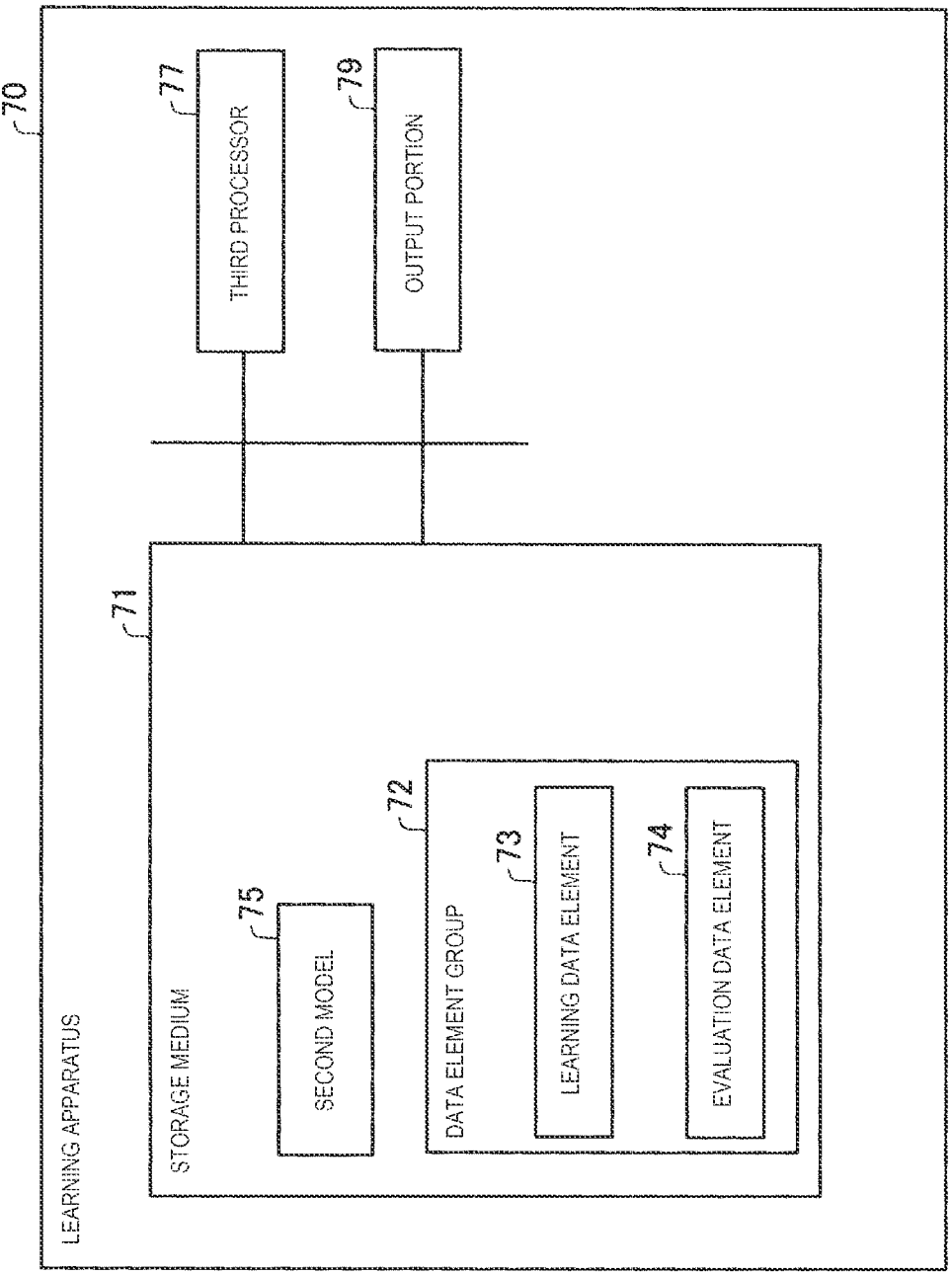
FIG. 12 is a diagram for explaining a learning apparatus.

FIG. 12 is a diagram for explaining the learning apparatus 70. The learning apparatus 70 determines the irradiation condition when the spectroscopic measurement apparatus 10 irradiates the target object 20 with the inspection light L1. The learning apparatus 70 includes a storage medium 71, a third processor 77, and an output portion 79.

The storage medium 71 includes a non-temporary non-volatile storage medium such as a flash memory or an EEPROM. The non-volatile storage medium has a second model 75 generated by learning. The second model 75 is an algorithm generated by learning and for determining the irradiation condition. In the present embodiment, the second model 75 uses Fisher linear discrimination and Mahalanobis distance as algorithms. In still another embodiment, the second model 75 may use a neural network type algorithm such as deep learning. The second model 75 changes for each selected individual, which will be described later, and for each irradiation condition of the light source 172 in the present embodiment.

The third processor 77 controls an operation of the learning apparatus 70 by executing various programs stored in the storage medium 71. The third processor 77 may be configured with at least one of a software and a hardware circuit. The output portion 79 is used to output various information. The output portion 79 is, for example, a liquid crystal monitor. The various information is, for example, irradiation conditions determined by using the learned second model 75. The output portion 79 may be a speaker that outputs sound instead of a display apparatus such as a liquid crystal monitor.

Figure 13:
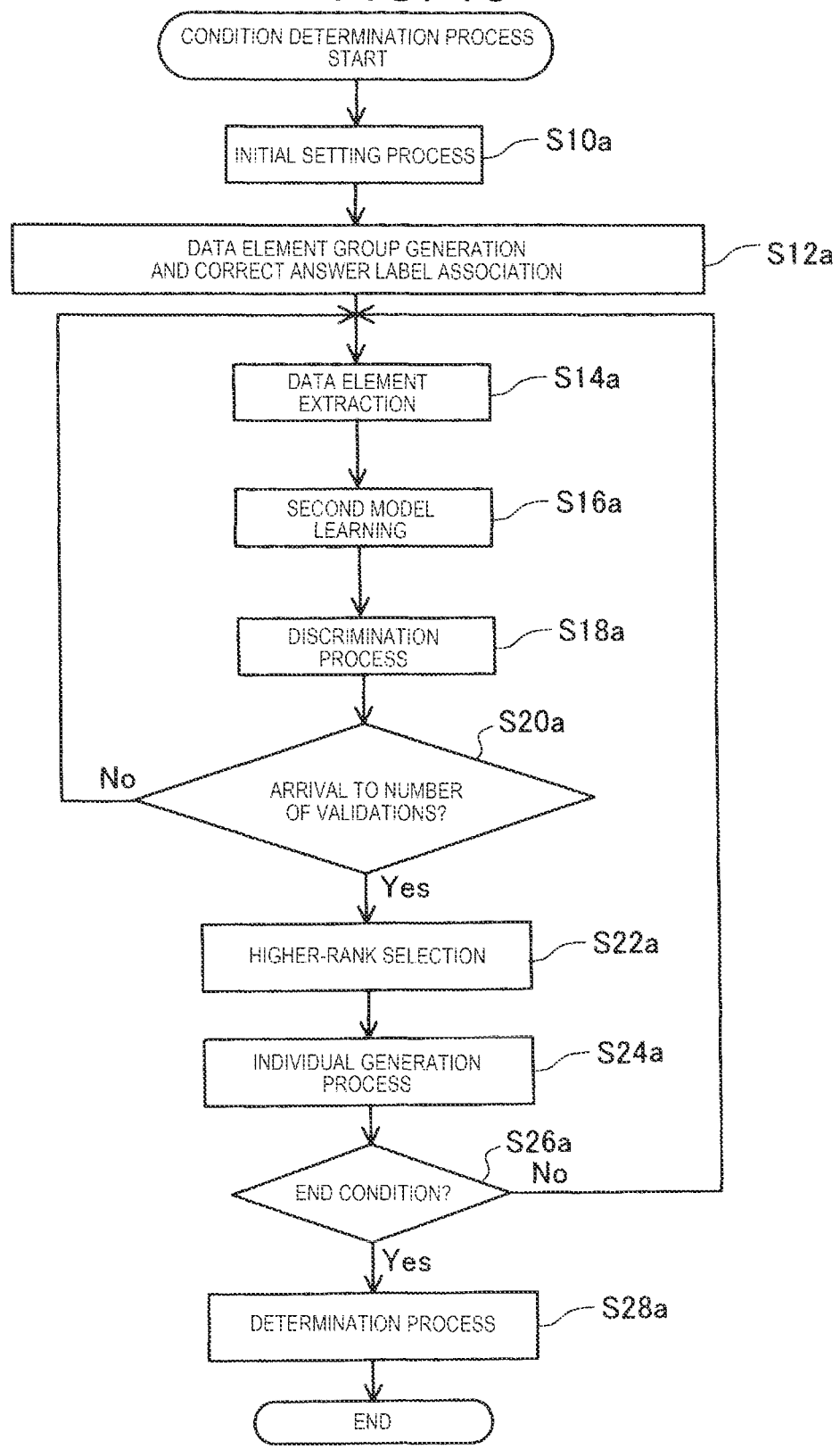
FIG. 13 is a flowchart illustrating a condition determination process for determining an irradiation condition.
Figure 14:
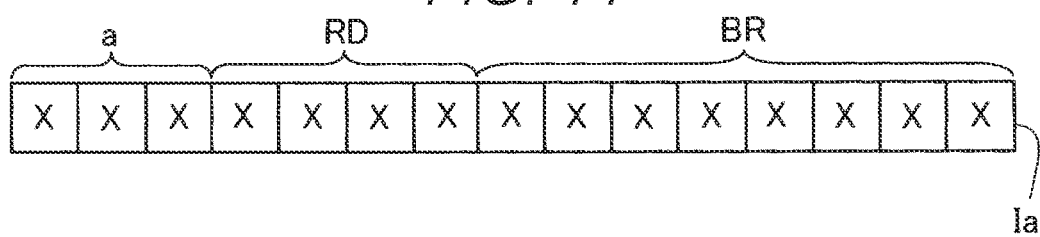
FIG. 14 is a diagram for explaining an individual used in the condition determination process.

FIG. 13 is a flowchart illustrating a condition determination process for determining an irradiation condition. FIG. 14 is a diagram for explaining an individual Ia used in the condition determination process. The condition determination process in FIG. 13 may be performed before or after the wavelength determination process in FIG. 6. Further, the condition determination process may be performed at the same time as the wavelength determination process. When performed at the same time, an element of the individual I of the first embodiment is also incorporated for the individual Ia. In the present embodiment, the individual Ia is also referred to as a separate entity Ia in order to distinguish the individual Ia from the individual I in the first embodiment.

As illustrated in FIG. 13, first, in step S10a, the third processor 77 executes an initial setting process. In the initial setting process, a genetic algorithm is used to select one irradiation condition from a plurality of irradiation conditions for the target object 20 of the spectroscopic measurement apparatus 10 and to generate the individual Ia. The irradiation condition is defined by factors that can influence generation of the spectroscopic spectrum. In the present embodiment, the factors for the irradiation condition are the angle a, an irradiation direction RD, and brightness BR illustrated in FIG. 3.

As illustrated in FIG. 14, the individual Ia is represented by a gene having a plurality of bits. In the individual Ia, the first 3 bits represent a condition of the angle a, the next 4 bits represent a condition of the irradiation direction RD, and the next 8 bits further represent a condition of the brightness BR. The angle a is, for example, any one of 15°, 30°, and 40°, 15° is represented by "100", 30° is represented by "010", and 40° is represented by "001". The irradiation direction RD represents the light source 172 used for irradiation among the plurality of light sources 172 illustrated in FIG. 2. For example, the plurality of light sources 172 arranged at equal intervals on a circumference are divided into four at each 90°, and the divided areas are set as a first area, a second area, a third area, and a fourth area. In this case, use of the light source 172 in the first area is represented by "1000", use of the light source 172 in the second area is represented by "0100", and use of the light source 172 in the third area is represented by "0010", and use of the light source 172 in the fourth area is represented by "0001". As the brightness BR, a value of 0 to 255 represented in binary is used as a gene.

In step S10a, the third processor 77 generates a predetermined number of individuals Ia having different gene contents, and in the present embodiment, 10 individuals are generated. That is, the third processor 77 executes to select one irradiation condition as the individual Ia among the plurality of irradiation conditions using the light source 172 by using the genetic algorithm 10 times. The 10 individuals Ia generated in step S10a are also referred to as a current generation population IG1a.

As illustrated in FIG. 13, then in step S12a, a data element group 78 is generated by using the population IG1a generated in step S10a. Specifically, the target object 20 is irradiated with the inspection light L1 by using the irradiation condition represented by each individual Ia of the population IG1a generated in step S10. The filter portion 16 extracts light having a specific wavelength from the inspection target light L2 reflected from the target object 20 by the irradiation of the inspection light L1, and the measurement portion 14 images the light having the specific wavelength. The data element group 78 is generated by generating a spectroscopic spectrum for each target object 20 based on data imaged by the signal processing portion 15. The spectroscopic spectrum for each of the plurality of target objects 20 for each irradiation condition represented by the individual Ia is generated, and set as each data element of the data element group 78. Each data element of the data element group 78 is associated with a correct answer label of the target object 20. The correct answer label is represented by any one of a non-defective product label and a defective product label, in the same manner as in the first embodiment. The specific wavelength is a wavelength determined in the wavelength determination process when the wavelength determination process illustrated in FIG. 6 of the first embodiment is already executed. Further, the specific wavelengths are 31 wavelengths, which is the maximum number of wavelengths which can be acquired by the filter portion 16 when the wavelength determination process is not executed.

Next, in step S14a, the third processor 77 extracts a learning data element 73 as one group to be used for learning the second model 75, and an evaluation data element 74 as a remaining group to be used for performance evaluation of the second model 75 after the learning, from the data element group 78 generated in step S12a. Here, the "one group" is also referred to as "one condition group", and the "remaining group" is also referred to as "remaining condition group". In step S14a, in the same manner as in step S14 in FIG. 6, the data element group 78 generated for each individual Ia is divided into a plurality of data areas. A data area occupying 20% is extracted as the learning data element 73, and a data area occupying the remaining 80% is extracted as the evaluation data element 74.

Next, in step S16a, the third processor 77 learns the second model 75 by using the learning data element 73 extracted in step S14a as an input element. In the present embodiment, the second model 75 is a Fisher linear discrimination in the same manner as the first model 55 of the first embodiment. Therefore, in step S16a, the third processor 77 determines the projection direction w in which a correct answer label has the maximum degree of separation between a data element group of a non-defective product label and a data element group of a defective product label, for each learning data element 73 according to the individual Ia. The third processor 77 stores a parameter representing the determined projection direction w as a second parameter in the storage medium 71. As described above, in step S16a, for each of the plurality of individual Ia, the third processor 77 learns the second model 75 learned so as to reproduce a correct answer label of the target object 20 belonging to one group, from a spectroscopic spectrum of the target object 20 belonging to the learning data element 73 as the one group acquired by using the irradiation conditions represented by the individual Ia.

Next, in step S18a, the third processor 77 inputs the evaluation data element 74 as the remaining group corresponding to each individual Ia to each of the second models 75 learned based on the spectroscopic spectrum generated for each individual Ia so as to discriminate the label of the target object 20 corresponding to each data element of the evaluation data element 74. That is, in step S18a, the third processor 77 inputs the spectroscopic spectrum of the evaluation data element 74, which is the remaining group, to the second model 75 to discriminate the label of the target object 20 belonging to the remaining group. This manner is applied for each of the individuals Ia. Step S18a is executed by calculating the Mahalanobis distance in the same manner as in step S18 of the first embodiment. Specifically, in step S18a, each data element of the evaluation data element 74 is projected in the projection direction w by using the second parameter representing the projection direction w determined by learning of the second model 75 so as to generate a feature amount. In step S18a, for each data element of the evaluation data element 74, the Mahalanobis distance is calculated, and a class closer to a distance from a learning data element group which is a defective product or a distance from a learning data element group which is a non-defective product is discriminated as the label of the evaluation data element 74. A discrimination rate, which is a discrimination result in step S18a, is calculated by the third processor 77 and stored in the storage medium 71. The discrimination rate is a ratio of the number of correctly discriminated labels to the number of evaluation data elements 74 input to the second model 75, for each of the second models 75 according to the individual Ia, and is a percentage. As described above, in step S18a, the spectroscopic spectrum, which is the evaluation data element 74 generated from the target object 20 by applying the irradiation condition to be used for learning the second model 75 is input to the second model 75 learned by using the learning data element 73 for each irradiation condition represented by the individual Ia so as to discriminate the label.

Next, in step S20a, the third processor 77 determines whether or not step S14a to step S18a have been executed at each of the number of validations. In the present embodiment, in the same manner as in step S20 of the first embodiment, it is determined whether or not each area of the five divided data areas for the data element group 78 was used as the learning data element 43.

In step S22a, the third processor 77 selects a higher-ranked individual having a high value of an evaluation function Lb, among the respective individuals Ia constituting the current generation population, in the same manner as in step S22 described above. The evaluation function Lb used in step S22a is represented by the equation (4).

Evaluation function $Lb$=average discrimination rate (4)

The average discrimination rate is an average value of discrimination rates calculated in step S18a at each time in validation for each of the individuals Ia.

In step S22a, the third processor 77 selects the higher-ranked 5 individuals having a higher evaluation value of the evaluation function, among the 10 individuals Ia.

In step S24a, the third processor 77 generates five new individuals Ia instead of the lower-ranked five individuals Ia which were not selected in step S22a. In step S24a, the third processor 77 uses, for example, mutation or crossover to generate a new individual Ia.

In step S26a, the third processor 77 determines whether or not an end condition is satisfied. The end condition is a condition that the individual having the highest evaluation value calculated by the evaluation function Lb in a predetermined number of continuous generations is the same without a change. In the present embodiment, the predetermined number of continuous generations is 50. When the end condition is not satisfied, the third processor 77 regards the next generation population as the current generation population, and performs step S14a to step S22a. In the same manner as in the first embodiment, regarding the individual Ia on which step S14a to step S20a have been already executed in the previous routine, the second processor 57 may omit step S14a to step S20a in this routine, and may execute step S14a to step S20a only for new individual Ia.

In step S22a to step S28a described above, for discriminating the label by using the second model 75, the third processor 77 determines whether or not the irradiation conditions represented by the individual Ia are used as an irradiation condition for obtaining a spectroscopic spectrum used for discriminating the label of the target object 20, based on a rate at which the label is correctly discriminated.

The irradiation condition determined by the condition determination process is applied when the target object 20 is irradiated with the inspection light L1 when acquiring the spectroscopic spectrum for discrimination.

According to the second embodiment, the same effect is obtained in that the configuration has the same manner as that of the first embodiment. For example, regarding discrimination of the label using the first model 55, by determining whether or not to use the second wavelength represented by the individual I as the wavelength constituting the spectroscopic spectrum based on the rate at which the label is correctly discriminated, it is possible to determine the second wavelength constituting the spectroscopic spectrum for discrimination from the first wavelength. As a result, it is possible to suppress a decrease in discrimination accuracy for a label while suppressing an increase in the number of wavelengths of a spectroscopic spectrum for discrimination. Further, according to the second embodiment, it is possible to determine the irradiation condition for obtaining the spectroscopic spectrum for discrimination by using the rate at which the label is correctly discriminated. As a result, discrimination accuracy for the label can be further improved.

C. Other Embodiments

C-1. Other Embodiment 1

In each of the above embodiments, Fisher linear discrimination and the Mahalanobis distance are used as the algorithms of the first model 55 and the second model 75, and the present embodiment is not limited thereto, and various learning algorithms may be used. For example, the first model 55 and the second model 75 may be algorithms such as a neural network or a capsule network. In this case, in the discrimination process in step S18 and step S18a illustrated in FIG. 6 and FIG. 13, the evaluation data elements 44 and 74 are input to the generated first model 55 or second model 75 without using the Mahalanobis distance. As a result, a label discriminated by the first model 55 and the second model 75 is output.

D. Other Aspects

The present disclosure is not limited to the embodiments described above, and can be realized in various aspects without departing from the spirit thereof. For example, the present disclosure can also be realized by the following aspects. The technical features in the above embodiments corresponding to technical features in each of the aspects to be described below can be replaced or combined as appropriate to solve some or all of the problems of the present disclosure, or to achieve some or all of the effects of the present disclosure. Further, when the technical feature is not described as essential in the present specification, the technical feature can be appropriately deleted.

(1) According to one aspect of the present disclosure, there is provided a determination method of a wavelength of a spectroscopic spectrum for discrimination. The determination method includes: imaging each of a plurality of target objects at a plurality of measurement wavelengths to obtain measurement data; selecting 0 or more second wavelengths from a plurality of first wavelengths including at least one of the plurality of measurement wavelengths to generate a plurality of individuals, by using a genetic algorithm; inputting, to a first model learned to reproduce a correct answer label of the target object belonging to one group from the measurement data of the target object belonging to the one group and a first spectroscopic spectrum determined by the second wavelength, the measurement data of the target object belonging to a remaining group and a second spectroscopic spectrum determined by the second wavelength to discriminate a label of the target object belonging to the remaining group, for each of the plurality of individuals; and determining whether or not to use the second wavelength as the wavelength of the spectroscopic spectrum for discrimination based on a rate at which the label is correctly discriminated. According to this aspect, regarding the discrimination of the label using the first model, by determining whether or not to use the second wavelength as the wavelength of the spectroscopic spectrum for discrimination based on the rate at which the label is correctly discriminated, it is possible to determine the second wavelength as the wavelength of the spectroscopic spectrum for discrimination from the first wavelength. Asa result, it is possible to suppress a decrease in discrimination accuracy for a label while suppressing an increase in the number of wavelengths of the spectroscopic spectrum for discrimination.

(2) In the aspect described above, in the determining, an evaluation value may be calculated for each combination of the second wavelengths represented by the individual by an evaluation function including a first term using the rate and a second term using the number of wavelengths of the second wavelength, and the calculated evaluation value may be used to determine whether or not to use the second wavelength of any of the combinations as the wavelength of the spectroscopic spectrum for discrimination. According to this aspect, it is possible to determine whether or not to use the second wavelength as a wavelength of the spectroscopic spectrum for discrimination, in consideration of the correctly discriminated rate and the number of wavelengths of the second wavelength.

(3) In the aspect described above, the evaluation value of the evaluation function may become higher as the rate is higher, and become higher as the number of wavelengths of the second wavelength is smaller, and in the determining, when the individual having a highest evaluation value is the same in a predetermined number of continuous generations, the second wavelength represented by the highest individual may be determined to be used as the wavelength of the spectroscopic spectrum for discrimination. According to this aspect, it is possible to determine the spectroscopic spectrum for discrimination in which the number of wavelengths is reduced while improving accuracy of label discrimination.

(4) In the aspect described above, the evaluation function may further include a third term using dispersion of each wavelength of the second wavelength. According to this aspect, it is possible to further determine whether or not to use the second wavelength as the wavelength of the spectroscopic spectrum for discrimination in consideration of the dispersion of each wavelength of the second wavelength.

(5) In the aspect described above, the evaluation value of the evaluation function may further become higher as the dispersion is smaller, and in the determining, when the individual having a highest evaluation value is the same in a predetermined number of continuous generations, the second wavelength represented by the highest individual may be determined to be used as the wavelength of the spectroscopic spectrum for discrimination. According to this aspect, the second wavelength having a small dispersion is further determined as the wavelength of the spectroscopic spectrum for discrimination.

(6) The aspect described above, may further include: acquiring a spectroscopic spectrum of the target object by using a spectroscopic measurement apparatus, in which the spectroscopic measurement apparatus may include a tunable interference filter that includes a first optical film and a second optical film configured to face the first optical film via a gap and to change a size of the gap by displacement, the tunable interference filter extracting light having a specific wavelength by adjusting the gap, and a signal processing portion that generates the spectroscopic spectrum by using the light extracted by the tunable interference filter. According to this aspect, it is possible to easily acquire the spectroscopic spectrum by using the spectroscopic measurement apparatus. In addition, when the evaluation function includes the dispersion of each wavelength of the second wavelength as a term, the second wavelength having a small dispersion is determined as the wavelength of the spectroscopic spectrum for discrimination. As a result, it is possible to reduce an adjustment time for the gap, so that it is possible to shorten a time for acquiring the spectroscopic spectrum for discrimination. Therefore, a discrimination time for the label can be shortened.

(7) The aspect described above, may further include: selecting one irradiation condition from a plurality of irradiation conditions using a light source to generate a plurality of separate entities, by using the genetic algorithm; inputting, to a second model learned to reproduce a correct answer label of the target object belonging to one condition group from a spectroscopic spectrum of the target object belonging to the one condition group acquired by using the irradiation condition represented by the separate entity, a spectroscopic spectrum of the target object belonging to the remaining condition group acquired by using the irradiation condition represented by the separate entity to discriminate a label of the target object belonging to the remaining condition group, for each of the plurality of separate entities; and determining, regarding the discrimination of the label by using the second model, whether or not to use the irradiation condition represented by the separate entity as the irradiation condition for obtaining the spectroscopic spectrum for discrimination, based on a rate at which the label is correctly discriminated. According to this aspect, it is possible to determine the irradiation condition for obtaining the spectroscopic spectrum for discrimination by using the rate at which the label is correctly discriminated. As a result, discrimination accuracy for the label can be improved.

(8) According to another aspect of the present disclosure, there is provided a determination method of determining an irradiation condition of a light source to discriminate a label associated with a target object by using a spectroscopic spectrum for discriminating the target object. The determination method includes: selecting one irradiation condition from a plurality of the irradiation conditions to generate a plurality of individuals, by using a genetic algorithm; inputting, to a model learned to reproduce a correct answer label of the target object belonging to one group from a spectroscopic spectrum of the target object belonging to the one group acquired by using the irradiation condition represented by the individual, a spectroscopic spectrum of the target object belonging to the remaining group acquired by using the irradiation condition represented by the individual to discriminate a label of the target object belonging to the remaining group, for each of the plurality of individuals; and determining, regarding the discrimination of the label by using the model, whether or not to use the irradiation condition represented by the individual as the irradiation condition for obtaining the spectroscopic spectrum for discrimination, based on a rate at which the label is correctly discriminated. According to this aspect, it is possible to determine the irradiation condition for obtaining the spectroscopic spectrum for discrimination by using the rate at which the label is correctly discriminated. As a result, discrimination accuracy for the label can be improved.

In addition to the aspects described above, the present disclosure can be realized in aspects of an apparatus for executing the determination method, a computer program for causing a computer to execute the determination method, a non-temporary storage medium for storing the computer program, and the like.

What is claimed is:

1. A determination method of determining a wavelength of a spectroscopic spectrum for discrimination, the determination method comprising:

imaging each of a plurality of target objects at a plurality of measurement wavelengths to obtain measurement data;

selecting, based on a genetic algorithm and the imaging of a target object of the plurality of target objects, a plurality of second wavelengths from a plurality of first wavelengths including at least one of the plurality of measurement wavelengths to generate a plurality of individuals, wherein each of the plurality of individuals forms a first data element group;

extracting one group and a remaining group from the first data element group of the each of the plurality of individuals;

for the each of the plurality of individuals learning a first model to reproduce a first correct answer label of the target object, from the measurement data of the target object belonging to the one group of a corresponding individual of the plurality of individuals and a first spectroscopic spectrum of a second wavelength of the plurality of second wavelengths;

inputting to each of the learned first model, the measurement data of the target object belonging to the remaining group of the corresponding individual of the plurality of individuals and a second spectroscopic spectrum of the second wavelength to discriminate a first label of the target object belonging to the remaining group;

calculating, based on the discrimination of the first label of the target object, a first evaluation value for each combination of the plurality of second wavelengths represented by an individual of the plurality of individuals;

evaluating, based on the calculated first evaluation value of the individual, the individual has a highest evaluation value in a specific number of continuous generations;

determining, based on the evaluation that the individual has the highest evaluation value and a first rate at which the first label is correctly discriminated, the second wavelength represented by the individual having the highest evaluation value as the wavelength of the spectroscopic spectrum for the discrimination; and discriminating a state of the target object based on the determined wavelength of the spectroscopic spectrum for the discrimination.

2. The determination method according to claim 1, wherein the calculation is further based on a first evaluation function including a first term using the first rate and a second term using a number of wavelengths of the plurality of second wavelengths.

3. The determination method according to claim 2, wherein the first evaluation value of the first evaluation function becomes higher as the first rate is higher, and becomes higher as the number of wavelengths of the plurality of second wavelengths is smaller.

4. The determination method according to claim 2, wherein the first evaluation function further includes a third term using dispersion of each wavelength of the plurality of second wavelengths.

5. The determination method according to claim 4, wherein the first evaluation value of the first evaluation function further becomes higher as the dispersion is smaller.

6. The determination method according to claim 1, further comprising:

acquiring the spectroscopic spectrum of the target object by using a spectroscopic measurement apparatus, wherein the spectroscopic measurement apparatus includes a tunable interference filter that includes a first optical film and a second optical film configured to face the first optical film via a gap and to change a size of the gap by displacement, the tunable interference filter extracting light having a specific wavelength by adjusting the gap, and a signal processing portion that generates the spectroscopic spectrum by using the light extracted by the tunable interference filter.

7. The determination method according to claim 1, further comprising:

selecting an irradiation condition, from a plurality of irradiation conditions using a light source, to generate a plurality of separate entities, by using the genetic algorithm, wherein each of the plurality of separate entities forms a second data element group;

extracting one condition group and a remaining condition group from the second data element group of the each of the plurality of separate entities;

for the each of the plurality of separate entities, learning a second model to reproduce a second correct answer label of the target object, from a third spectroscopic spectrum of the target object belonging to the one condition group acquired by using the irradiation condition represented by a separate entity of the plurality of separate entities;

inputting to each of the learned second model, a fourth spectroscopic spectrum of the target object belonging to the remaining condition group acquired by using the irradiation condition represented by the separate entity to discriminate a second label of the target object belonging to the remaining condition group;

calculating, based on the discrimination of the second label of the target object a second evaluation value for the separate entity;

evaluating, based on the calculated second evaluation value of the separate entity, the separate entity has a highest evaluation value in a specific number of continuous generations; and determining, based on the evaluation that the separate entity has the highest evaluation value and a second rate at which the second label is correctly discriminated, the irradiation condition represented by the separate entity having the highest evaluation value for obtaining the spectroscopic spectrum for the discrimination.

8. A determination method of determining an irradiation condition of a light source to discriminate a label associated with a target object by using a spectroscopic spectrum for discriminating the target object, the determination method comprising:

selecting a first irradiation condition from a plurality of irradiation conditions to generate a plurality of individuals, by using a genetic algorithm, wherein each of the plurality of individuals forms a first data element group;

extracting one group and a remaining group from the first data element group of the each of the plurality of individuals;

for the each of the plurality of individuals, learning a model to reproduce a correct answer label of the target object, from a first spectroscopic spectrum of the target object belonging to the one group acquired by using the first irradiation condition represented by an individual of the plurality of individuals;

inputting to each of the learned model, a second spectroscopic spectrum of the target object belonging to the remaining group acquired by using the first irradiation condition represented by the individual to discriminate the label of the target object belonging to the remaining group;

calculating, based on the discrimination of the label of the target object, an evaluation value for the individual;

evaluating, based on the calculated evaluation value of the individual, the individual has a highest evaluation value in a specific number of continuous generations;

determining, based on the evaluation that the individual has the highest evaluation value and a rate at which the label is correctly discriminated, the first irradiation condition represented by the individual having the highest evaluation value as the irradiation condition for obtaining the spectroscopic spectrum for the discrimination; and discriminating a state of the target object based on the spectroscopic spectrum for the discrimination.

9. The determination method according to claim 1, wherein the one group is used for learning the first model, and the remaining group is used for performance evaluation of the first model after the learning of the first model.

* * * * *